United States Patent [19]
Wallace et al.

[11] Patent Number: 5,370,236
[45] Date of Patent: Dec. 6, 1994

[54] SEPARATOR DEVICE TO SEPARATE DENSE PARTICULATE MATTER FROM LESS DENSE PARTICULATE MATTER

[75] Inventors: Joseph E. Wallace; Leo L. Castagno; Christopher L. Hudson, all of Creston, Iowa

[73] Assignee: Vanmark Corporation, Creston, Iowa

[21] Appl. No.: 76,205

[22] Filed: Jun. 14, 1993

[51] Int. Cl.$^5$ ................................................ B03B 5/60
[52] U.S. Cl. ..................................... 209/173; 209/465; 209/492; 198/550.1; 198/671
[58] Field of Search ............ 209/158, 159, 172, 172.5, 209/173, 205, 465, 490, 492; 198/550.1, 518, 671

[56] References Cited

U.S. PATENT DOCUMENTS

| | | | |
|---|---|---|---|
| 3,115,117 | 12/1963 | Brelsford | 198/671 X |
| 3,363,757 | 1/1968 | Seymour | |
| 3,792,772 | 2/1974 | Wallace | |
| 3,822,015 | 7/1974 | Hsieh et al. | 209/173 |
| 4,230,561 | 10/1980 | McMurray | 209/173 X |
| 4,684,458 | 8/1987 | Grotto | 198/671 X |

Primary Examiner—Robert P. Olszewski
Assistant Examiner—Boris Milef
Attorney, Agent, or Firm—Zarley, McKee, Thomte, Voorhees & Sease

[57] ABSTRACT

A separator apparatus to separate less dense particulate material from dense particulate material has a tank for containing fluid which has sidewalls and a sloping bottom with upper and lower ends. A vertically oriented housing is secured to the tank and has an upper and lower end with the lower end being in the tank and the upper end extending above the tank. An auger means is mounted within the housing and extends the substantial length thereof. A discharge location is located in the tank adjacent the lower end of the bottom for removing dense objects therefrom. The housing has a discharge location at its upper end for discharging the less dense objects lifted from the tank by the auger apparatus. A spout is located at the discharge location for the housing and has a spout that has a wall tangential to the cylindrical housing for quickly and easily receiving less dense objects from the outer periphery of the helical flighting.

8 Claims, 4 Drawing Sheets

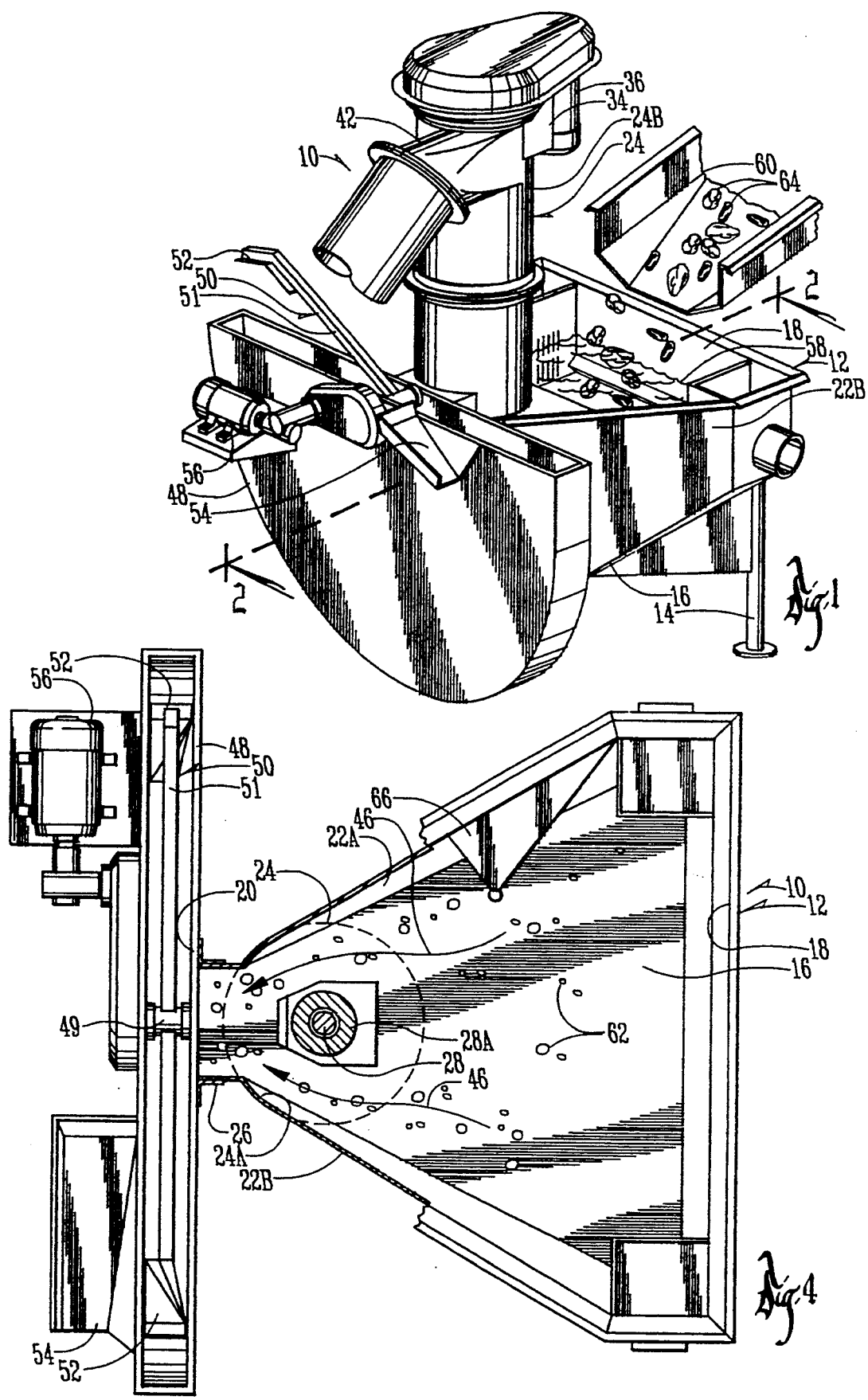

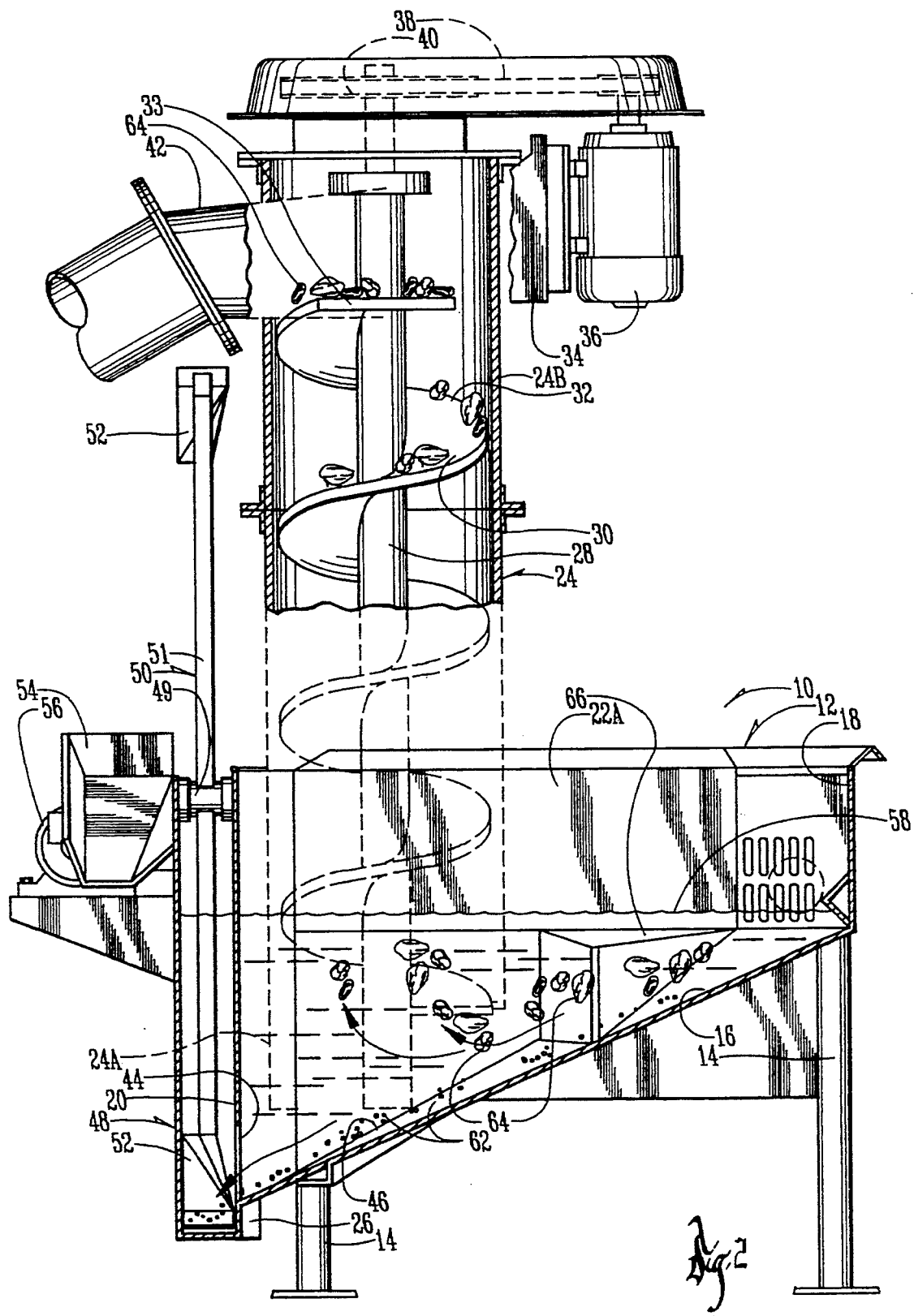

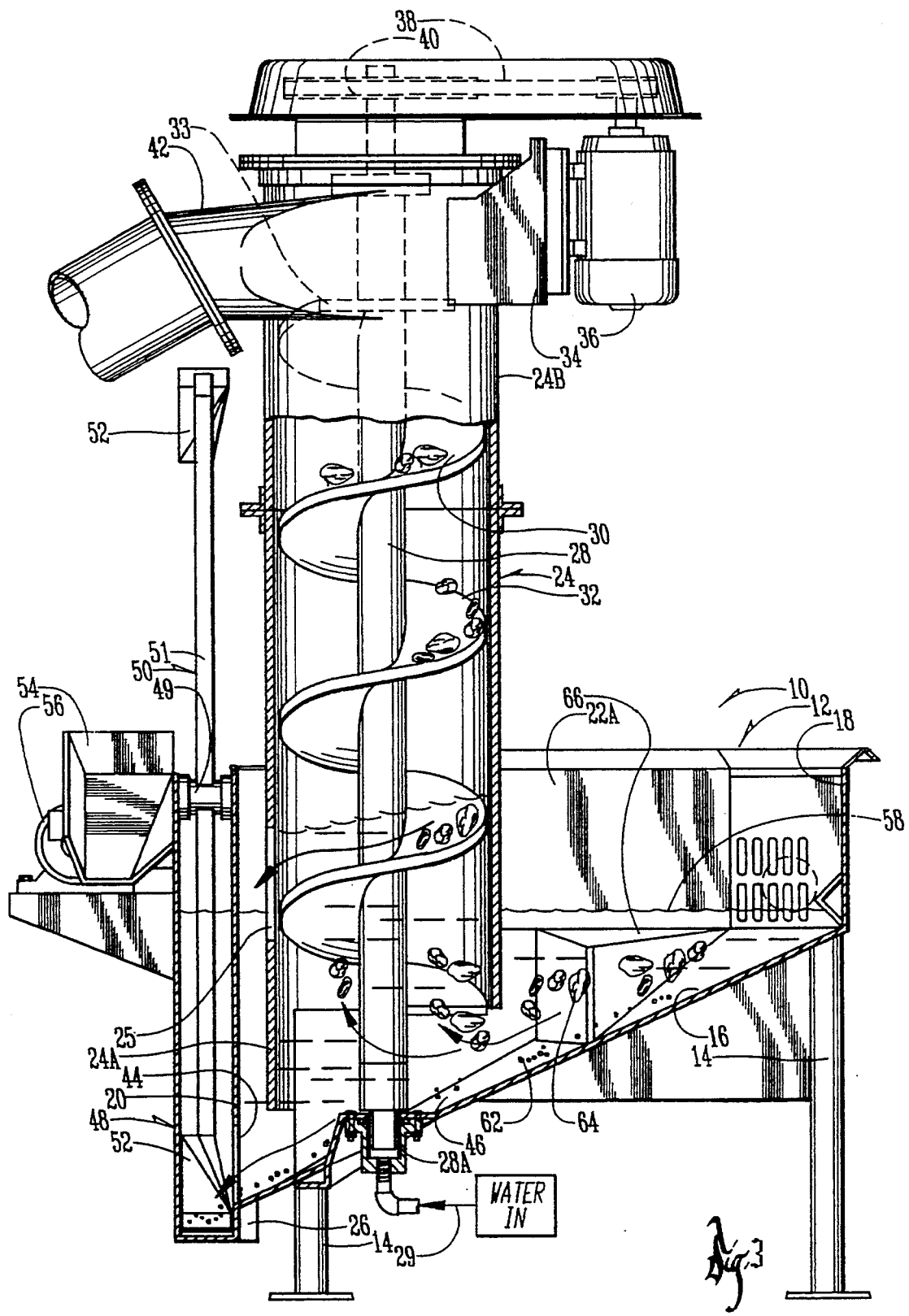

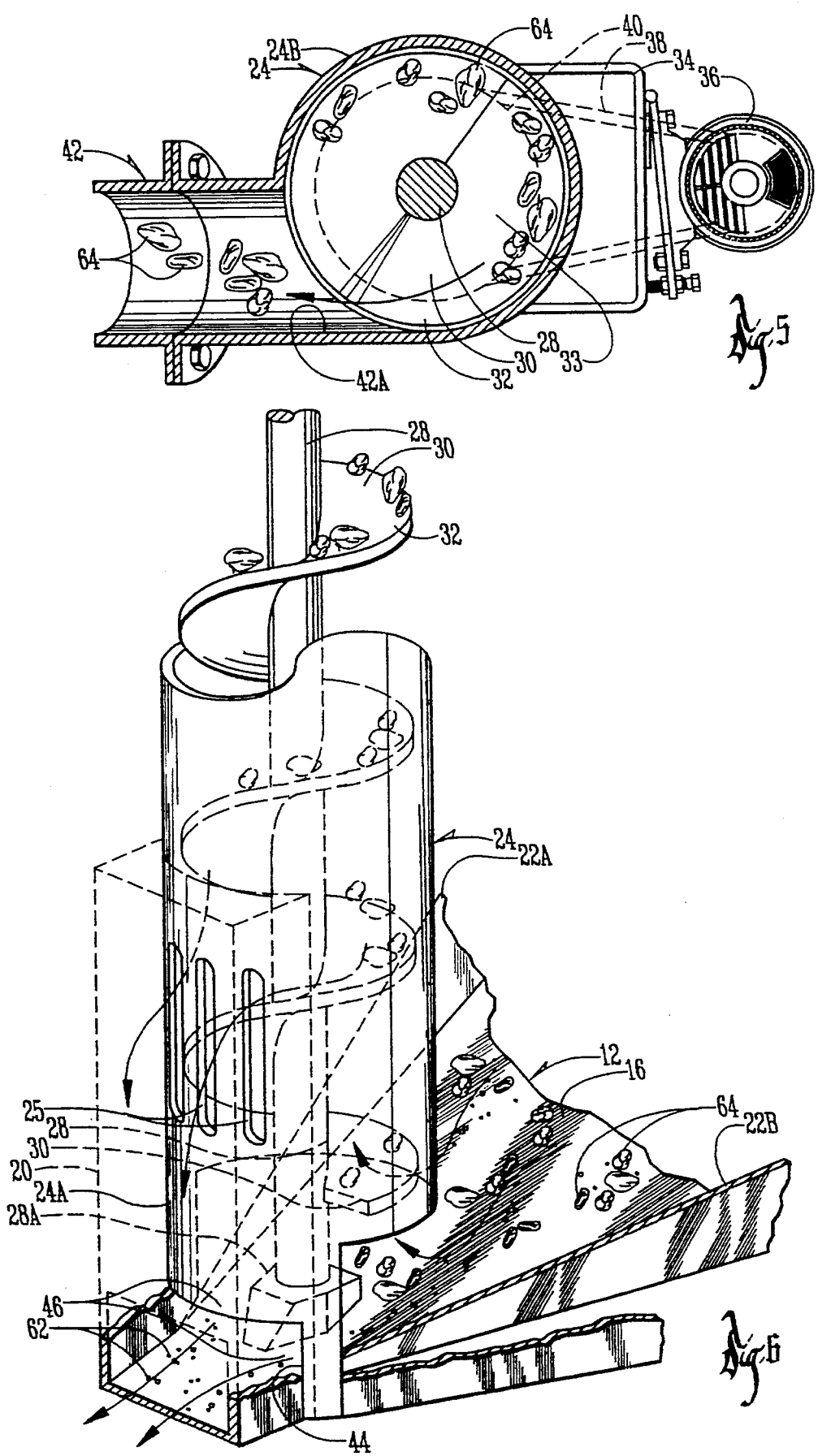

SEPARATOR DEVICE TO SEPARATE DENSE PARTICULATE MATTER FROM LESS DENSE PARTICULATE MATTER

BACKGROUND OF THE INVENTION

Devices for separating dense material from less dense material (i.e. stones from potatoes) have been in use for a long period of time. Reference is made to U.S. Pat. Nos. 3,363,757 and 3,792,772. The '772 patent utilized a fluid holding tank which had a vertical auger disposed therein. The bottom of the tank was inclined so that stones and the like would migrate to the bottom of the tank for discharge thereof whereas the lighter potatoes would float towards the upper levels of the fluid to be upwardly discharged by an auger shaft that was journaled at the bottom of the tank.

Among the shortcomings of that device is that the bearing and bearing plate used on the bottom end of the auger shaft would often get pebbles and the like underneath which would impair the rotation of the auger shaft. Further, the auger bearing provided an impediment for the migration of stones and the like down the inclined bottom of the tank towards the discharge opening.

Further, the potato discharge structure at the upper end of the auger did not well accommodate the movement of potatoes upwardly on the outer periphery of the auger flighting, thus incurring some damage to the potatoes as they were being discharged from the upper end of the auger.

It is therefore a principal object of this invention to provide a device for separating dense particulate matter from less dense particulate matter which will permit the more dense particulate matter to move quickly down an inclined path towards a discharged location without being impeded by other structure of the device.

A further object of this invention is to provide a separator device to separate dense particulate matter from less dense particulate matter which will quickly allow the less dense material to be exited from the upper end of an auger without damage thereto, and without any congestion of overloading of the apparatus.

These and other objects will be apparent to those skilled in the art.

BRIEF SUMMARY OF THE INVENTION

The device of this invention comprises a tank for containing fluid which has sidewalls and an inclined bottom with upper and lower ends. A vertically oriented housing is secured to the tank and has an upper and lower end with the lower end being in the tank and the upper end extending above the tank. An auger means is mounted within the housing and extends the substantial length thereof. A discharge location is located in the tank adjacent the lower end of the bottom. For removing heavier objects therefrom. The housing has a discharge location at its upper end for discharging the lighter objects lifted from the tank by the auger apparatus. A spout is located at the discharge location for the housing and has a spout that has a wall tangential to the cylindrical housing for quickly and easily receiving lighter objects from the outer periphery of the helical flighting.

BRIEF DESCRIPTION OF THE DRAWINGS

FIG. 1 is a perspective view of the device of this invention;

FIG. 2 is an enlarged scale sectional view taken on line 2—2 of FIG. 1;

FIG. 3 is a view similar to that of FIG. 2 but shows the bearing mounting of the vertical auger shaft;

FIG. 4 is a plan view of the device of FIG. 1;

FIG. 5 is a sectional view taken on 5—5 of FIG. 3; and

FIG. 6 is a partial perspective view of the lower end of the vertical auger housing.

DESCRIPTION OF THE PREFERRED EMBODIMENT

The numeral 10 designates the device of this invention which comprises a tank 12 adapted to retain a quantity of fluid. Tank 12 is supported by a plurality of vertical legs 14 and a sloping bottom 16. Tank 12 has a front sidewall 18, a rear sidewall 20 (FIG. 2) and converging tapered sidewalls 22A and 22B which connect the front sidewall 18 and the rear sidewall 20.

A vertical cylindrical housing 24 having a lower end 24A and an upper end 24B is supported in any convenient means such as by bracket 26 (FIG. 1). The lower end 24A of housing 24 extends into the tank 12 adjacent the intersection of bottom 16 and rear sidewall 20.

A vertical auger shaft 28 is mounted on bearing 28A as best shown in FIG. 3. An inlet water line 29 is connected to bearing 28A and is adapted to insert water under pressure into the interior of tank 12. Auger shaft 28 has helical flighting 30 thereon with the flighting having an outer parameter 32. The upper end of the flighting terminates in a substantially horizontal flat section 33 which extends approximately 180° around the shaft 28.

With reference to FIGS. 2 and 3, a bracket 34 is secured to housing 24 adjacent its upper end 24B. A motor 36 is secured to bracket 34 and is connected by conventional. Belt 38 to a pulley wheel 40 on the upper end of the auger shaft 28. A discharge chute 42 is secured to the upper end of housing 24. With reference to FIG. 5, chute 42 has a wall 42A which is tangential with the housing 24.

Tank 12 has a discharge opening 44 at its lower end adjacent the intersection of bottom 16 and the bottom of rear sidewall 20. See FIGS. 2 and 3. With reference to FIG. 4, the arrows 46 define a clear and unobstructed pathway for The stones or heavier material passing down over inclined bottom 16 towards the discharge opening 44.

A tank 48 is secured to the rear sidewall 20 of tank 12. A shaft 49 supported by tank 48 has a paddle wheel 50 secured thereto. Paddle wheel 50 has a plurality of radially extending scopes 51 which have hand elements 52 on the outer ends thereof. With reference to FIG. 1, a discharge tray 54 is secured to tank 48 as is a motor and gear assembly 56 which is operatively secured to shaft 49. The tank 48 and related structure including the paddle wheel 50 is essentially disclosed in the above described Pat. No. 3,927,772.

A quantity of fluid 58, normally water, is injected into the tank 12 through the inlet 29 as best seen in FIGS. 2 and 3. An inlet chute 60 is secured to or at least mounted adjacent to the front sidewall 18 of tank 12 to allow potatoes or the like to be deposited within the tank. The numeral 62 designates stones which are often inadvertently harvested with the potato 64.

A baffle 66 located within tank 12 is located with respect to the auger shaft 28 in a manner to quiet the turbulence in the fluid 58 caused by the rotating auger.

When the level of fluid 58 is substantially as shown in FIGS. 2 and 3, the harvested potatoes 64 or other lightweight material is deposited in inlet chute 60 for gravity flow thereof into the tank 12. The auger shaft is rotated by motor 36 in the manner described. The stones or heavier objects 62 migrate down the inclined bottom 16 along the pathways 46 towards the discharge opening 44. It is important to note that the pathways 46 are unobstructed to provide an efficient and clear path for the stones to move towards the discharge opening.

The potatoes 64, being less dense, rise above the level of the inclined bottom 16 and are picked up by the flighting 30 and carried upwardly into the housing 24. As seen particularly in FIG. 5, the potatoes tend to migrate out towards the outer periphery or perimeter 32 of the flighting 30 as they are being lifted upwardly in housing 24. The discharge chute 42, being tangentially located with respect to the housing 24 facilitates the movement of the potatoes from the housing to the discharge chute. As a result, there is less damage of the potatoes as they leave the auger structure, and the potatoes are more quickly discharged from the auger housing. The flat section 33 at the top of the flighting 30 also facilitates the discharge of potatoes from the flighting into the chute 42. Since the flighting 30 tends to carry water upwardly, one or more drainage openings 25 are provided in the housing 24, to allow water to drain from the flighting back into the Lank 12, as seen in FIGS. 3 and 6.

While not comprising a part of this invention, the stones 62 move through the discharge opening 44 and are picked up by the paddle wheel 50 essentially as described in Pat. No. 3,792,772.

From the foregoing, it is seen that the device of this invention provides structure which overcomes the shortcomings of the prior art, and which particularly speeds the removal of stones or the like from harvested vegetables such as the potatoes. In addition, the device of this invention expedites the removal of the cleaned potatoes from the auger system. Thus, the device of this invention achieves essentially all of its stated objectives.

We claim:

1. A separator apparatus to separate stones from less dense objects, comprising,
   a tank for containing fluid and having sidewalls and a sloping bottom with upper and lower ends,
   a vertically oriented housing secured to said tank and having an open lower end in the lower end of said tank and an upper end extending above said tank,
   an auger means mounted within said housing and extending the substantial length of said housing,
   a discharge means in said tank at the lower end of said sloping bottom for removing dense objects therefrom, with said sloping bottom extending directly upwardly from said discharge means towards its upper end,
   said housing having a discharge means at its upper end for discharging less dense objects lifted from said tank by said auger means.

2. The device of claim 1 wherein said auger means includes a central shaft and helical flighting having an outer periphery on said shaft, said housing being cylindrical In shape, and said discharge means on the upper end of said housing comprising a spout having a wall tangential to said housing for receiving lighter objects from the outer periphery of said helical flighting.

3. The device of claim 2 wherein said spout has a lateral width approximately half of the diameter of said housing.

4. The device claim 1 wherein said tank is tapered outwardly from a narrow width adjacent the discharge means therein to a wider width remote from said discharge means.

5. The device of claim 1 wherein said tank has a baffle means adjacent said housing to resist any turbulence of fluid in said tank caused by said auger means.

6. The device of claim 1 wherein said inclined bottom has at least one sloping path from its upper end to its lower end which is free from protrusions so as to permit dense objects moving downwardly in a direction parallel to said bottom to have a substantially uninterrupted path to said discharge means of said tank.

7. A separator apparatus to separate stones from less dense objects, comprising,
   a tank for containing fluid and having sidewalls and a sloping bottom with upper and lower ends,
   a vertically oriented housing secured to said tank and having an open lower end in the lower end of said tank and an upper end extending above said tank,
   an auger means mounted within said housing and extending the substantial length of said housing,
   a discharge means in said tank adjacent the lower end of said bottom for removing dense objects therefrom,
   said housing having a discharge means at its upper end for discharging less dense objects lifted from said tank by said auger means,
   said auger means including a central shaft and helical flighting having an outer periphery on said shaft,
   said housing being cylindrical in shape,
   said discharge means on the upper end of said housing comprising a spout having a wall tangential to said housing for receiving less dense objects from the outer periphery of said helical flighting; said spout having a lateral width approximately of said housing.

8. A separator apparatus to separate stones and the like from less dense objects, comprising,
   a tank for containing fluid and having sidewalls and a sloping bottom with upper and lower ends,
   a vertically oriented housing secured to said tank and having an open lower end in the lower end of said tank and an upper end extending above said tank,
   an auger means mounted within said housing and extending the substantial length of said housing,
   a discharge means in said tank adjacent the lower end of said bottom for removing dense objects therefrom,
   said housing having a discharge means at its upper end for discharging less dense objects lifted from said tank by said auger means,
   said auger means including a central shaft and helical flighting having an outer periphery on said shaft,
   said housing being cylindrical in shape, and
   said discharge means on the upper end of said housing comprising a spout having a wall tangential to said housing for receiving lighter objects from the outer periphery of said helical flighting,
   said spout having a lateral width approximately half of the diameter of said housing.

* * * * *

UNITED STATES PATENT AND TRADEMARK OFFICE
CERTIFICATE OF CORRECTION

PATENT NO. : 5,370,236
DATED : December 6, 1994
INVENTOR(S) : Joseph E. Wallace, Leo L. Castagno; and Christopher L. Hudson It is certified that error appears in the above-indentified patent and that said Letters Patent is hereby corrected as shown below:

Column 4, line 42, after the word "approximately" insert -- half of the diameter --.

Signed and Sealed this

Seventh Day of February, 1995

Attest:

BRUCE LEHMAN

Attesting Officer

Commissioner of Patents and Trademarks